(12) United States Patent
Holst et al.

(10) Patent No.: US 7,471,172 B2
(45) Date of Patent: Dec. 30, 2008

(54) MICROWAVE TRANSMISSION UNIT INCLUDING LIGHTNING PROTECTION

(75) Inventors: Thorsten Holst, Taastrup (DK); Morten Hagensen, Hillerød (DK); Carsten Gadegaard Jensen, Graested (DK); Stig Jensen, Søborg (DK)

(73) Assignee: LGP Allgon AB, Taby (SE)

( * ) Notice: Subject to any disclaimer, the term of this patent is extended or adjusted under 35 U.S.C. 154(b) by 188 days.

(21) Appl. No.: 10/555,015

(22) PCT Filed: Apr. 30, 2004

(86) PCT No.: PCT/DK2004/000296

§ 371 (c)(1),
(2), (4) Date: Sep. 7, 2006

(87) PCT Pub. No.: WO2004/097979

PCT Pub. Date: Nov. 11, 2004

(65) Prior Publication Data

US 2007/0053129 A1    Mar. 8, 2007

(30) Foreign Application Priority Data

May 2, 2003    (DK) .............................. 2003 00665

(51) Int. Cl.
*H01P 7/02* (2006.01)

(52) U.S. Cl. ..................................... 333/202; 361/119

(58) Field of Classification Search ......... 361/117–119; 333/202, 206
See application file for complete search history.

(56) References Cited

U.S. PATENT DOCUMENTS

| | | | |
|---|---|---|---|
| 3,818,389 A | 6/1974 | Fisher | |
| 4,091,344 A | 5/1978 | LaTourrette | |
| 4,887,180 A | 12/1989 | Climent et al. | |
| 5,502,715 A | 3/1996 | Penny | |
| 5,508,873 A | 4/1996 | Knapp et al. | |
| 5,844,766 A | 12/1998 | Miglioli | |
| 2002/0135963 A1* | 9/2002 | Pagliuca | 361/117 |
| 2006/0030181 A1* | 2/2006 | Blake et al. | 439/95 |

* cited by examiner

*Primary Examiner*—Don P Le
(74) *Attorney, Agent, or Firm*—Birch, Stewart, Kolasch & Birch, LLP

(57) ABSTRACT

Microwave transmission unit, especially a microwave filter (1), and including a cabinet (2) with a first coaxial connector (3) and a second coaxial connector (4), where both coaxial connectors include an inner conductor (6) and an outer conductor (7), said cabinet (2) being made of a non-conducting material, such as plastics, and coated with a metal layer. The microwave transmission unit (1) includes a lightning conductor (5) which is dimensioned so as to conduct lightning current without being damaged to any serious extent, and which is electrically connected to the outer conductor (7) of the first coaxial connector (3) and to the outer conductor (7) of the second coaxial connector (4).

25 Claims, 3 Drawing Sheets

MICROWAVE TRANSMISSION UNIT INCLUDING LIGHTNING PROTECTION

TECHNICAL FIELD

The invention relates to a microwave transmission unit, especially a microwave filter, and including a cabinet with a first coaxial connector and a second coaxial connector, where both coaxial connectors include an inner conductor and an outer conductor, said cabinet being made of a non-conducting material, such as plastics, and coated with a metal layer.

BACKGROUND ART

Microwave filters are often in form of so-called cavity resonators where the resonances in a hollow cabinet are utilized for filtering specific frequencies. The cavity of the cabinet can be shaped in many ways. An input coaxial conductor conducts alternating currents with differing frequencies to a cabinet. Columnar resonators are provided in the cabinet, said resonators being of a length typically corresponding to one fourth of the wavelength of the frequency at which the filter is to operate.

The inner conductor of the input coaxial connector is connected to an input resonator, and the inner conductor of the output coaxial connector is connected to an output resonator. A plurality of columnar resonators is arranged in the filter cavity between the input resonator and the output resonator, and at a first end these columnar resonators are secured to the bottom of the cabinet. Together with a so-called trimming screw, each columnar resonator defines a capacitor at its free ends. A turning of the trimming screw renders it possible to adjust the capacitance and consequently the properties of the filter. When all the resonators are secured to the same surface, such as the bottom of the cabinet, the filters are called combline filters, and when all the resonators are alternately secured to two opposing surfaces, said filters are called interdigital filters. The outer conductor of both the input coaxial connector and the output coaxial connector is connected to the metal cabinet.

A filter of the above type can be in form of a passive filter without an electric amplification, or it can be in form of an active filter where one of the resonators is connected to the input of an electric amplification circuit amplifying the signal, and where the output of the amplification circuit is connected to a subsequent resonator.

The patent literature reveals many examples of such microwave filters. U.S. Pat. No. 4,091,344 (Wavecom Industries) discloses a microwave filter of the combline type, and U.S. Pat. No. 3,818,389 (Bell Telephone Laboratories) discloses a microwave filter of the interdigital type.

Modern microwave filters are often manufactured with a cabinet and resonators of solid metal, and they are optionally formed integral by being milled out of a metal block. The microwave filter can be mounted outdoors on a building or an aerial mast for instance for mobile telephony, and accordingly said microwave filter is subjected to wind and weather and other environmental strains. Accordingly, it is of vital importance that the structure is strong. Strokes of lightning are particularly problematic because it must be possible to divert or conduct very strong lightning currents away from vulnerable components. The microwave filters on aerial masts are often mounted close to the aerial, a coaxial cable connecting the aerial to the coaxial input of the microwave filter. The filter only allows frequencies within a specific frequency band to pass, optionally in an amplified form, to the output coaxial connector while the remaining frequencies are filtered off. In connection with strokes of lightning, the lightning current runs preferably on the outer side of the outer conductor of the coaxial cables. As the outer conductors of the coaxial connectors are directly connected to the metal cabinet of the filter, the lightning current can easily run from the outer conductor of the input coaxial connector, through the outer conductor of the output coaxial connector and further to the ground or vice versa without causing major damage to the components of the microwave filter. The metal cabinet presents often a material thickness of 1 to 10 mm.

In order to reduce the price and the weight of the microwave filters of this type, said filters can be made of plastics, such as by way of moulding, where the plastic surface is subsequently coated with a metal capable of conducting the electric signals to be subjected to a filtering. The coating process can be in form of activation by means of palladium, autocatalytic deposition of nickel or copper followed by an electrolytic deposition of for instance silver. Such a metal coating is in practice often of a thickness of 5 to 200 µm, which suffices completely for conducting aerial signals of an average effect of up to a few hundred watts. However, a strong lightning current can cause a damaging heating of the metal coating due to the relatively highohmic resistance and low heat capacity of said metal coating.

U.S. Pat. No. 5,502,715 (Penny) discloses a microwave filter which can be made of metallised plastics. According to this publication the risk of potential damages caused by strokes of lightning can be reduced by grounding the ports of the filter. The microwave filter of this publication is in form of a diplex filter including a first coaxial connector and a second coaxial connector, where both coaxial connectors are used as input and output connectors, respectively.

U.S. Pat. No. 5,508,873 discloses a surge protector for broadband coaxial systems, wherein the cabinet is made of metal or metallised plastics. It is not mentioned in this patent how the metallisation layer can be protected from a strong lightening current running between the outer conductors of the coaxial connectors and causing a damaging heating of the metallisation layer.

DESCRIPTION OF THE INVENTION

The object of the invention is to improve the lightning protection of a microwave transmission unit of the above type.

The object is according to the invention obtained by the metal coating of the cabinet being 5-200 µm thick and the microwave transmission unit including a lightning conductor which is dimensioned so as to conduct lightning current without being damaged to any serious extent, and which is electrically connected to the outer conductor of the first coaxial connector and to the outer conductor of the second coaxial connector, said lightning conductor includes a metal body of a cross-sectional area of at least 10-200 mm$^2$. As a result, a lightning current running in an outer conductor of a coaxial connector connected to the first coaxial connector can be efficiently conducted to the outer conductor of a coaxial connector connected to the second coaxial connector or vice versa without causing damaging heatings of the relatively thin metal layer of the cabinet.

According to the invention, the lightning conductor includes a metal body of a cross-sectional area of at least 10 to 200 mm$^2$. Such a metal body presents an electric resistance being suitably low for ensuring that far the major portion of the lightning current runs through said metal body and not through the metal coating of the cabinet.

According to another embodiment of the microwave transmission unit according to the invention, the first coaxial connector and the second coaxial connector of the microwave transmission unit may be arranged at their respective ends of the cabinet, where a cover for closing said cabinet includes the lightning conductor.

According to an advantageous embodiment of the microwave transmission unit according to the invention, the cover is made of metal, such as aluminium, with the result that the cover can per se form the lightning conductor.

The thickness of the cover can for instance be 3 mm or more.

According to an alternative embodiment of the microwave transmission unit according to the invention, the cover may be made of a non-conducting material, such as plastics, whereby the lightning conductor is in form of a metal body embedded in the non-conducting material.

According to a preferred embodiment of the microwave transmission unit according to the invention, the lightning conductor may be electrically connected to the outer conductor of the first coaxial connector and to the outer conductor of the second coaxial connector by means of fittings which are screwed into the lightning conductor and flanges on the coaxial connectors by means of screws. The resulting embodiment is particularly simple.

According to an embodiment of the microwave transmission unit according to the invention, the first coaxial connector and the second coaxial connector may be arranged at the same end of the cabinet and fastened to a common plate-shaped metal fitting forming the lightning conductor. The resulting embodiment is particularly simple.

According to an alternative embodiment of the microwave transmission unit according to the invention, the lightning conductor may be in form of a mounting member for mounting the microwave filter on a structural part.

The lightning conductor presents preferably an electric resistance of max. 1 m$\Omega$.

The total electric resistance between the outer conductors of the coaxial connectors through the lightning conductor is preferably max. 0.1 m$\Omega$, most advantageously max. 0.01 m$\Omega$.

According to an embodiment of the microwave transmission unit according to the invention, said microwave transmission unit may be in form of a microwave filter of the cavity resonator type including columnar resonators formed integral with the cabinet.

According to yet another embodiment of the microwave transmission unit according to the invention, the microwave filter may include a trimming plate of solid metal with threaded holes for trimming screws, where the ends of said trimming screws together with the resonators define capacitances, and where the trimming plate forms the lightning conductor. The resulting embodiment is particularly simple.

BRIEF DESCRIPTION OF THE DRAWINGS

The invention is explained in greater detail below with reference to preferred embodiments illustrated in the drawing, in which.

BEST MODES FOR CARRYING OUT THE INVENTION

Figure 1:
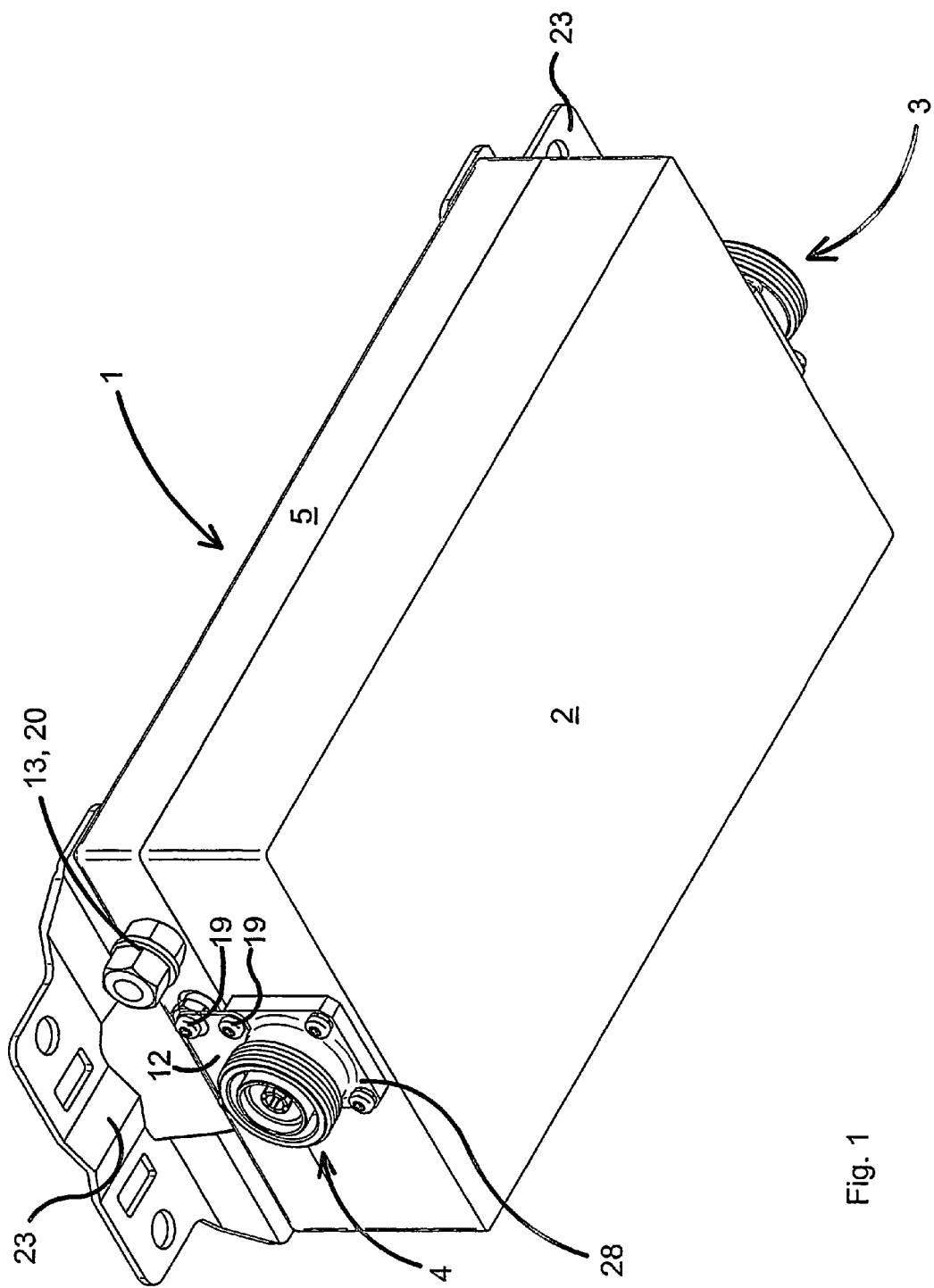
FIG. 1 is a perspective view of a microwave filter according to the invention in the assembled state.

FIG. 1 illustrates a first embodiment of microwave filter 1 according to the invention. The microwave filter 1 includes a cabinet 2, a cover 5, an almost invisible input coaxial connector 3 and an output coaxial connector 4. Here the cover 5 is made of solid metal and forms per se a lightning conductor. A fitting 12 of metal plate is screwed by means of screws 19 into both the cover 5 and a flange 28 on the output coaxial connector 4, said flange continuing directly into the outer conductor of the output coaxial connector 4. Correspondingly, the input coaxial connector 3 is connected to the cover 5 by means of a fitting 12 at the invisible end. An earth screw 13 with nuts 20 screwed thereon is mounted in the cover 5 and can be used for connecting said cover to an aerial mast or the like by means of a cable. A mounting member 23 is screwed into the cover 5 and used for mounting the microwave filter on an aerial mast or the like.

Figure 2:
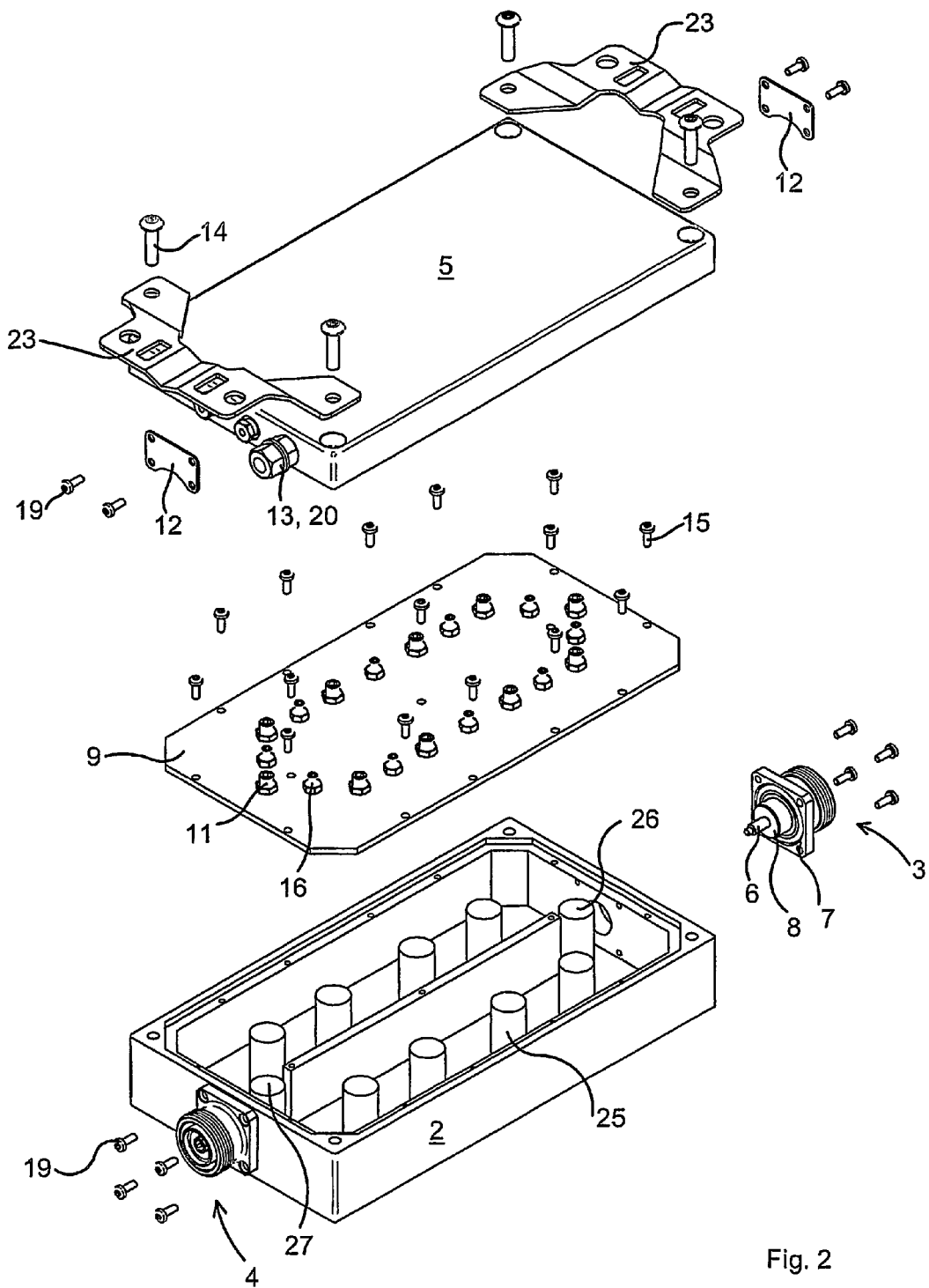
FIG. 2 is an extended perspective view of the microwave filter of FIG. 1.

FIG. 2 is an extended perspective view of the microwave filter of FIG. 1. The cabinet 2 includes a cavity, cf. at the bottom of FIG. 2, and a plurality of columnar resonators 25, 26, 27 protrude into said cavity from the bottom of the cabinet 2. The inner conductor 6 of the input coaxial connector 3 is electrically connected to an input resonator 26, and the inner conductor 6 of the output coaxial connector 4 is connected to an output resonator 27. Both the input coaxial connector 3 and the output coaxial connector 4 include a dielectric 8 between the inner conductor 6 and the outer conductor 7. A so-called trimming cover 9 is inserted between the cover 5 of the microwave filter and the cavity of the cabinet 2, said trimming cover 9 including a plurality of threaded holes with so-called trimming screws 11 screwed therein. These trimming screws 11 are placed directly opposite the resonators 25, 26, 27 in such a manner that a capacitance is defined in the space between the free end of each trimming screw and the upper end of each resonator 25, 26, 27. An adjustment of the trimming screws 11 renders it possible to adjust the individual capacitances with the result that the properties of the filter can be adjusted. The trimming cover 9 can be made of metal or a metal-coated non-conducting material in order to establish an electric connection between the individual trimming screws 11 and the cabinet 2. The trimming cover 9 is secured to the cabinet 2 by means of trimming cover screws 15.

So-called coupling screws 16 are also screwed into the trimming cover 9. Unlike the trimming screws 11, these coupling screws 16 are not positioned directly above the resonators 25, 26, 27, but in the spaces therebetween, and these coupling screws 16 are used for altering the "coupling" between two resonators. When the coupling screw 16 is positioned far down in the space between the resonators, said resonators 25, 26, 27 do not "see" one another corresponding to a "weak coupling". A trimming of the filter involves an adjustment of both the trimming screws 11 and the coupling screws 16, and such a trimming is often carried out manually.

In the illustrated embodiment, the cover 5 used for closing the cabinet 2 is made of solid metal, such as aluminium, and as mentioned above the cover 5 is connected to the input coaxial connector 3 and the output coaxial connector, respectively, by means of a fitting 12. As a result, the cover operates as a lightning conductor with a particularly low ohmic resistance and inductance with the effect that lightning current running in the outer conductor of a coaxial cable connected to the input coaxial connector 3 can run through the fitting 12 to the cover 5, through the fitting 12 to the outer conductor 4 of the output coaxial connector and then further through the outer conductor of a coaxial cable connected to the output coaxial connector 4 or vice versa. Thus the metal coating on the inner sides of the cabinet 2 and on the resonators 25, 26, 27 and optionally the outer side of said cabinet 2 as well as the trimming cover 11 are not subjected to a strong lightning current which can otherwise damage said coatings.

In the illustrated embodiment, the cover 5 is made of solid metal. A strong bar of metal can optionally be embedded in a cover 5 of for instance plastics. The cover is secured to the walls of the cabinet 2 by means of cover screws 14.

According to an alternative embodiment, the trimming cover 9 can be used as lightning conductor, said trimming cover optionally being made of metal plate and be connected to the outer conductor of the input coaxial connector 3 and the outer conductor of the output coaxial connector 4 by means of suitable fittings.

The cover 5 on the microwave filter shown in FIGS. 1 and 2 presents a height so as to allow inclusion of electronics for instance for amplifying the signal filtered in the filter cavity.

Mounting members 23 are secured to the cover 5 for securing the microwave filter to the wall of a building or to an aerial mast.

As mentioned above, the lightning conductor can be formed by the cover 5 provided said cover is made of solid metal, or by a bar embedded in said cover. According to a further embodiment, a mounting member for securing the microwave filter to a wall or to an aerial mast can extend in the entire length of the filter and be connected to the coaxial connectors 3, 4 by means of suitable fittings so as thereby to form the lightning conductor.

Figure 3:
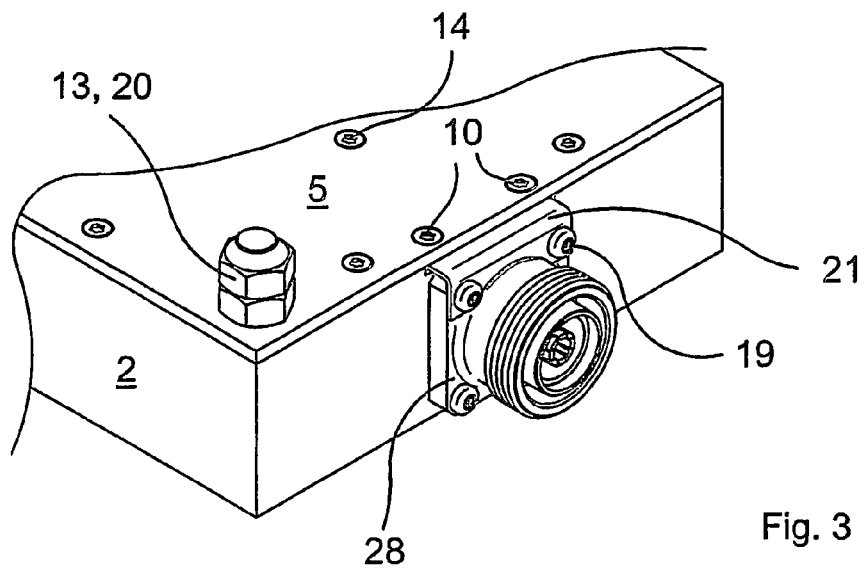
FIG. 3 is a sectional view of a second embodiment of a microwave filter according to the invention.
Figure 4:
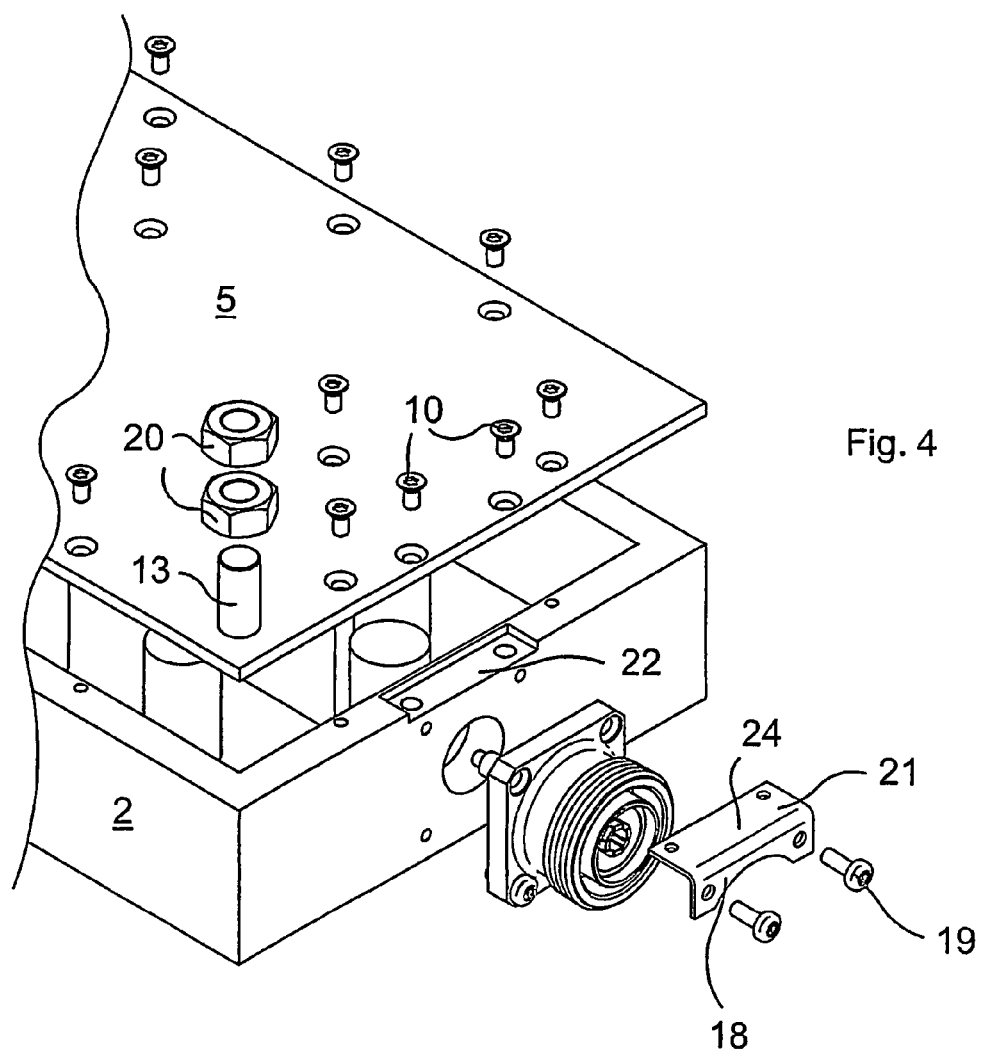
FIG. 4 is an extended, sectional, perspective view of the microwave filter of FIG. 3.

FIGS. 3 and 4 illustrate another embodiment of a microwave filter according to the invention. This microwave filter is a so-called passive filter, which does not include an electric amplification circuit or the like. Thus the cover 5 is not as high as the cover of the embodiment shown in FIGS. 1 and 2, and as shown here this cover 5 can be in form of a solid metal plate. An active filter may be provided with the cover shown in FIGS. 3 and 4, and the included electronics can be arranged at another location inside the cabinet.

The fitting 21 connecting the flanges 28 of the coaxial connectors to the cover 5 is angular and include two webs 18, 24 arranged perpendicular to one another. One web 18 is screwed onto the flange 28, and the second web 24 extends into a notch 22 in the cabinet 2 and is screwed onto the bottom side of the cover 5 by means of screws 10. This embodiment is advantageous by the cover 5 including an edge being too narrow for allowing screws to be screwed therein.

As illustrated in FIG. 4, an earth screw 13 with an external thread is secured to the cover 5. An earth cable can be secured by means of nuts 20 so as to obtain an additional lightning protection.

In both illustrated embodiments, the microwave filters are in form of so-called diplex filters. Thus both coaxial connectors can be used as both input and output.

The invention is not limited to microwave filters, but deal also with other types of microwave transmission units. The unit can for instance be a supply unit, i.e. also called a "current injection unit", where the coaxial cable is utilized for supplying a supply current in addition to being utilized for transmitting microwaves. Thus the inner conductor can inside the unit be connected to a current source, an inserted capacitor ensuring that the current from the current source runs out of the unit in the correct direction. The invention may also deal with a so-called "coupler", where a minor portion of the microwaves are filtered off so as to be further processed or measured, and where the remaining microwaves leave the unit without having been subjected to a processing.

The cover of both embodiments can be dismounted and mounted again without involving a loosening of the coaxial connectors, which is particularly advantageous because the cover can be dismounted without risking affecting the signal path of the microwaves.

The fittings 12, 21 connecting the outer conductors of the coaxial connectors to the lightning conductor, as well as the lightning conductor per se do not form part of the signal path of the microwaves through the microwave filter, and accordingly they do not affect the signal-processing properties thereof.

The fittings 12, 21 and the screws 19 for mounting said fittings are preferably made of copper or another metal or metal alloy possessing a good electric conductivity.

The contact resistance at the transition from the coaxial connector to the fitting and from said fitting to the lightning conductor must, of course, be as weak as possible.

In the illustrated embodiments, the total inductance of the lightning protection path, viz. of the path of the lightning current through the fittings 12, 2, the screws 19 and the cover 15, 16 is in the range of 0.5 to 2 nH.

The cover of both embodiments is preferably made of a 3 mm thick aluminium plate.

The fittings 12, 21 are made of copper and are approximately 30 mm wide corresponding to the width of the flanges 28 on the coaxial connectors 3, 4, and they are approximately 0.5 to 2 mm thick.

It is assumed that a lightning current of 100 kA caused by a stroke of lightning in an aerial mast propagates in such a manner that 50 kA runs through the mast to the ground and the remaining 50 kA runs through the aerial cable to the microwave transmission unit, and therefore said microwave transmission unit must be able to tolerate such a current. Tests have shown that the illustrated embodiments can tolerate a current pulse of 50 kA without the unit being damaged.

As the lightning conductor and the fittings are integrated parts of the unit, no postmounting or particular mounting of lightning protection is required. Such a postmounting or particular mounting of lightning protection can otherwise be rather time-consuming and difficult when the unit is to be mounted for instance on a mast.

The earth screw described previously is electrically connected to the lightning conductor so as to provide an additional lightning protection. When the unit is mounted on a mast, a cable can connect said mast to the earth screw so as to provide a well defined current path for possible lightning currents not running in the coaxial cable.

The illustrated embodiments include input coaxial connectors and output coaxial connectors at their respective ends, but the invention relates also to a microwave transmission unit where the input coaxial connector and the output coaxial connector are arranged at the same end. By the latter embodiment, the two coaxial connectors can be screwed into the end of the cabinet through a common mounting plate, which accordingly is connected to the outer conductors of the coaxial connectors and thereby form the lightning conductor.

The invention claimed is:

1. Microwave transmission unit, such as a microwave filter, and including a cabinet with a first coaxial connector and a second coaxial connector, where both coaxial connectors include an inner conductor and an outer conductor, said cabinet being made of a non-conducting material, such as plastics, and coated with a metal layer, wherein the microwave transmission unit includes a lightning conductor which is dimensioned so as to conduct lightning current without being damaged to any serious extent, and which is electrically connected to the outer conductor of the first coaxial connector and to the outer conductor of the second coaxial connector, and the microwave filter includes a cover for closing the cabinet, said cover including the lightning conductor.

2. Microwave transmission unit according to claim 1, wherein
the lightning conductor includes a metal body of a cross-sectional area of minimum 10 to 200 mm².

3. Microwave transmission unit according to claim 1, wherein
the first coaxial connector and the second coaxial connector are arranged at the same end of the cabinet and are fastened to a common plate-shaped metal fitting forming the lightning conductor.

4. Microwave transmission unit according to claim 1, wherein
the lightning conductor is formed by a mounting member for mounting of the microwave transmission unit on a structural part.

5. Microwave transmission unit according to claim 1, wherein
the electric resistance of the lightning conductor is max. 1 mΩ.

6. Microwave transmission unit according to claim 1, wherein
the total electric resistance between the outer conductors of the coaxial connectors through the lightning conductor is max. 0.1Ω, most advantageously max. 0.01Ω.

7. Microwave transmission unit (1) according to claim 1, wherein
the metal coating of the cabinet is 5 to 200 μm thick.

8. Microwave transmission unit, such as a microwave filter, and including a cabinet with a first coaxial connector and a second coaxial connector, where both coaxial connectors include an inner conductor and an outer conductor, said cabinet being made of a non-conducting material, such as plastics, and coated with a metal layer, wherein
the microwave transmission unit includes a lightning conductor which is dimensioned so as to conduct lightning current without being damaged to an serious extent and which is electrically connected to the outer conductor of the first coaxial connector and to the outer conductor of the second coaxial connector,
the first coaxial connector and the second coaxial connector are arranged at their respective ends of the cabinet, and
the microwave filter includes a cover for closing the cabinet, said cover including the lightning conductor.

9. Microwave transmission unit according to claim 8, wherein
the cover is made of solid metal, preferably aluminium.

10. Microwave transmission unit according to claim 8, wherein
the cover is made of a non-conducting material, such as plastics, and that the lightning conductor is formed as a metal body embedded in the non-conducting material.

11. Microwave transmission unit, such as a microwave filter, and including a cabinet with a first coaxial connector and a second coaxial connector, where both coaxial connectors include an inner conductor and an outer conductor, said cabinet being made of a non-conducting material, such as plastics, and coated with a metal layer, wherein
the microwave transmission unit includes a lightning conductor which is dimensioned so as to conduct lightning current without being damaged to any serious extent, and which is electrically connected to the outer conductor of the first coaxial connector and to the outer conductor of the second coaxial connector, and the lightning conductor is electrically connected to the outer conductor of the first coaxial connector and to the outer conductor of the second coaxial connector through fittings, which are screwed into said lightning conductor and a flange on the coaxial connectors by means of screws.

12. Microwave transmission unit according to claim 1 such as a microwave filter, and including a cabinet with a first coaxial connector and a second coaxial connector, where both coaxial connectors include an inner conductor and an outer conductor, said cabinet being made of a non-conducting material, such as plastics and coated with a metal layer, wherein
the microwave transmission unit includes a lightning conductor which is dimensioned so as to conduct lightning current without being damaged to any serious extent, and which is electrically connected to the outer conductor of the first coaxial connector and to the outer conductor of the second coaxial connector, and
the microwave filter is of the cavity resonator type including columnar resonators formed integral with the cabinet.

13. Microwave filter according to claim 12, further including a trimming plate of solid metal with threaded holes for trimming screws, the free ends of which form capacitances together with the resonators, wherein
the trimming plate forms the lightning conductor.

14. Microwave transmission unit, such as a microwave filter, comprising:
a cabinet including a bottom wall and side walls, the cabinet being made of a non-conducting material, such as plastics, and coated with a metal layer;
a cover closing the cabinet and including a metallic body serving as a lightning conductor; and
first and second coaxial connecters mounted on the cabinet and each including an inner conductor and an outer conductor, wherein
the metallic body is electrically connected to the outer conductor of each the first and second coaxial connectors by means of fittings possessing a good electric conductivity,
the fittings are attached to each of the first and second coaxial connectors and to the metallic body so as to convey lightning currents therethrough,
a total electric resistance between the outer conductors of the first and second coaxial connectors through the metallic body and the fittings is max. 0.1Ω, and
the metallic body and the fittings are provided as integrated parts of the microwave transmission unit.

15. Microwave transmission unit according to claim 14, wherein the metallic body has a cross-sectional area of at least 10-200 mm².

16. Microwave transmission unit according to claim 14, wherein the cover is made of solid metal.

17. Microwave transmission unit according to claim 14, wherein the cover includes a strong bar of metal.

18. Microwave transmission unit according to claim 14, wherein the cover is a trimming cover.

19. Microwave transmission unit according to claim 14, wherein the fittings are screwed into the metallic body and a flange on each of the first and second coaxial connectors by means of screws.

20. Microwave transmission unit according to claim 14, wherein the fittings are approximately 30 mm wide and 0.5 to 2 mm thick.

21. Microwave transmission unit according to claim 14, wherein the fittings are made of one of the group consisting of copper, another metal and a metal alloy.

22. Microwave transmission unit according to claim 14, wherein the first coaxial connector and the second coaxial connector are arranged at a same end of the cabinet.

23. Microwave transmission unit according to claim 14, wherein the electric resistance of the metallic body is max. 1 mΩ.

24. Microwave transmission unit according to claim 14, wherein the microwave transmission unit is a cavity resonator type microwave filter including columnar resonators formed integral with the cabinet.

25. Microwave transmission unit according to claim 14, wherein the total electric resistance between the outer conductors of the first and second coaxial connectors through the metallic body and the fittings is max. 0.01Ω.

* * * * *